United States Patent
Masterman et al.

[11] Patent Number: 6,075,113
[45] Date of Patent: Jun. 13, 2000

[54] WHEEL COMPOSITION

[75] Inventors: Thomas Craig Masterman, Foster City; Mark David Rackley, Los Gatos, both of Calif.

[73] Assignee: Mirror Image Technologies, Inc., Menlo Park, Calif.

[21] Appl. No.: 09/166,347

[22] Filed: Oct. 5, 1998

[51] Int. Cl.$^7$ .................................................. C08G 63/02
[52] U.S. Cl. ........................... 528/176; 528/193; 528/194
[58] Field of Search .................................... 528/176, 193, 528/194

[56] References Cited

U.S. PATENT DOCUMENTS

| | | | |
|---|---|---|---|
| Re. 28,982 | 9/1976 | Crawford et al. | 260/873 |
| 3,651,014 | 3/1972 | Witsiepe | 260/75 R |
| 3,718,715 | 2/1973 | Crawford et al. | 260/873 |
| 3,723,569 | 3/1973 | Hoeschele | 260/835 |
| 3,763,109 | 10/1973 | Witsiepe | 260/75 R |
| 3,766,146 | 10/1973 | Witsiepe | 260/75 R |
| 3,801,547 | 4/1974 | Hoeschele | 260/75 M |
| 3,917,743 | 11/1975 | Schroeder et al. | 260/860 |
| 3,963,800 | 6/1976 | Gipp et al. | 260/860 |
| 4,040,670 | 8/1977 | Williams | 301/5.3 |
| 4,070,065 | 1/1978 | Heitfield | 301/5.3 |
| 4,124,570 | 11/1978 | Scheibelhoffer et al. | 528/273 |
| 4,205,158 | 5/1980 | Hoeschele | 528/300 |
| 4,208,073 | 6/1980 | Hechinger | 301/5.3 |
| 4,251,652 | 2/1981 | Tanaka et al. | 528/279 |
| 4,328,333 | 5/1982 | Barbee et al. | 528/301 |
| 4,669,517 | 6/1987 | Krishnan | 366/45 |
| 4,687,835 | 8/1987 | Zeilstra et al. | 528/300 |
| 4,699,432 | 10/1987 | Klamer | 301/5.3 |
| 4,970,275 | 11/1990 | Still et al. | 525/437 |

OTHER PUBLICATIONS

Richard J. Cella, "Morphology of Segmented Polyester Thermoplastic Elastomers," J. Polymer. Sci., No. 42, 727–740 (1973). John Wiley & Sons, Inc.

G.K. Hoeschele, "Segmented Polyether Ester Copolymers–A New Generation of High Performance Thermoplastic Elastomers," Polymer Engineering and Science, Dec., No. 12, vol. 14 (1974).

Morton Brown, "Thermoplastic Copolyester Elastomers: New Polymers for Specific End–Use Applications," Rubber Industry, Jun. 1975, 102–106.

(List continued on next page.)

Primary Examiner—Terressa M. Boykin

[57] ABSTRACT

A slow speed wheel with high abrasion resistance, good riding attributes and excellent bounce from a composition comprising at least 20 wt % of a segmented thermoplastic copolyester or a blend of copolyesters consisting of essentially of a multiplicity of recurring long chain ester units and short chain ester units joined head-to-tail through ester linkages, said long chain ester units being represented by the formula (A):

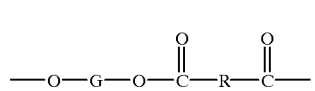

and said short chain units being represented by the formula (B):

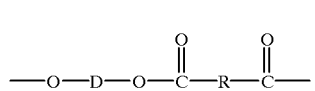

wherein said short chain ester units make up between about 10 to about 95 wt % of said copolyester or blend of copolyesters; G is a divalent radical remaining after the removal of terminal hydroxyl groups from a polyether glycol copolymer based on poly(propylene oxide) and poly (ethylene oxide); R is a divalent radical remaining after removal of carboxyl groups from a aromatic dicarboxylic acid; D is a divalent radical remaining after removal of hydroxyl groups from a diol.

41 Claims, 6 Drawing Sheets

OTHER PUBLICATIONS

J.R. Wolfe, Jr., "Elastomeric Polyether–Ester Block Copolymers I. Structure–Property Relationships of Tetramethylene Terephthalate/Polyether Terephthalate Copolymers," Rub. Chem. & Tech., 4, 50, 689 (1977).

"Milestones," Transworld Skateboarding, Aug. 1998, 176–187.

W.F. Diller (Gunter Oertel, Editor), "Industrial Hygiene of PU Raw Materials," Polyurethane Handbook, pp. 120–127, 2nd Edition (1993). Carl Hanser Verlag., Munich, Germany (English).

"Castable Polyurethane Elastomers," Polyurethane Manufacturers Association (PMA) Web Home Page, www.pma-home.org, Jul. 30, 1998, 800 Roosevelt Road, Bldg. C, Suite 20, Glen Ellyn, IL. 60137.

"Dupont Hytrel Engineering Thermoplastic Elastomer Product and Properties Guide," pp. 1–9, Dated Oct. 1991, Document No. 185477C, Reorder No. H–14888–1. Printed in USA.

"Dupont Hytrel Engineering Thermoplastic Elastomers Product Guide and Properties," 7 Page Document, Downloaded From Dupont Website Approx. Jul. 1998.

"Dupont Hytrel Engineering Thermoplastic Elastomer Injection Moulding Guide," pp. 1–22, Downloaded From Dupont Website Approx. Jul. 1998, Dated Mar. 1997, Doc. No. E–73180. Printed in Switzerland.

"DSM Arnitel Data Sheets," pp. 42–43 and Product Description (undated), Downloaded From DSM Website Approx. Jul. 1998. Product Bulletin Dated Dec. 1994.

WHEEL COMPOSITION

BACKGROUND OF THE INVENTION

1. The Field of the Invention

This invention relates to a slow speed wheel composition. More precisely, this invention relates to an improved thermoplastic slow speed wheel composition that has excellent wearing and riding properties and, by virtue of being a thermoplastic, is easily and quickly processed into finished parts for use in devices designed for slow speed operation.

2. Description of the Prior Art

Suitable slow speed wheel compositions should be wear resistant, have resiliency, bounce and offer a "good ride." Since a "good ride" is subjective and will vary from individual to individual, such a wheel composition should be modifiable to suit individual needs. It should come in a variety of hardness ranges and should react well to imperfections in the riding surface. For example, a small pebble should not eject a rider from a skateboard, nor should a small pebble cause a shopping cart wheel to stop rolling. In addition, the surface properties of the wheel should be modifiable for different situations. For example, in some instances a rider of a slow speed recreational wheel may want a slippery wheel so that tricks involving sliding can be performed with ease. Alternatively, the rider of a recreational wheel may want a soft ride wheel for bumpy surface riding or may want good grip when enhanced control is needed. A tired traveler pulling luggage through a airport may want good vibrational damping on their suitcase with wheels.

Wheel compositions suitable in some aspects for slow speed applications have been around since early man. Perhaps the first wheels were constructed of stone. The first skate wheels generally where constructed of wood and had poor wear resistance. In the early 1950s, skate wheels where constructed of metal which had better wear resistance, but reacted poorly to street pebbles and tended to slide. In the mid 1960s, clay wheels where constructed which exhibited enhanced wear over metal and also offered a better quality ride and reacted better to riding surface imperfections such as pebbles. A major innovation took place in the late 1960s with the introduction of crosslinked polyurethane wheels, also known in the art as cast urethane wheels. Such polyurethane wheels exhibit excellent wearing and riding properties. This very brief history of skate/skateboard wheels is summarized in TABLE 1.

TABLE 1

| APPROXIMATE YEAR OF INTRODUCTION OF SKATE/SKATEBOARD WHEEL | WHEEL MATERIAL |
| --- | --- |
| Late 1880s | WOOD |
| Early 1950s | METAL |
| Mid 1960s | CLAY |
| Late 1960s | URETHANES |

Source: TransworldSkateboarding, August 1988, pp 176–187.

The vast majority of commercial high performance recreational wheels on the market today are crosslinked polyurethanes, typically formed from the reaction of multifunctional isocyanates and polyols. Varying isocyanates and polyols and varying proportions give wheels of differing hardness ranges, wear resistance and riding attributes. This process produces outstanding wheels with excellent wearing and riding properties. These materials are generally described in *Polyurethane Handbook* by Güunter Oertel (1993) and by various manufacturers such as Innovative Polymers, Olin Corporation, Bayer Corporation and Kryptonics. They are also described by the Polyurethane Manufacturers Association. This process suffers from several major difficulties. First is a slow set up time of the crosslinked plastic. That is, the time that is required for nearly complete chemical reaction is long and can be from 30 minutes to many hours. Prematurely removing a wheel from a mold can cause dimensions of said wheel to change. Second, a major drawback is the general toxicity of the starting materials (see Güunter, 1993 described above). Great care must be taken to ensure worker safety and to protect the environment. Thirdly, by virtue of the fact that these polymers are crosslinked, they cannot be re-melted and reused for secondary articles.

The driving force for the development of thermoplastic elastomers in the early days was as a possible vulcanized rubber replacement. Many attempts have been made to prepare high performance wheels using conventional thermoplastic processing techniques such as injection molding. Most have not enjoyed commercial success because it comes down to material. Most materials are not suitable for making thermplastically processed wheels. Quite simply, all materials are not created equal.

Low cost, beginner wheels such as those marketed by Variflex® are injection molded from a variety of plastics. However, these do not have the properties needed for high performance wheels.

Klamer (U.S. Pat. No. 4,699,432) discloses an injection molded dual material safety wheel produced of a rigid material and a soft material wherein the rigid material provides support and the soft material provides shock absorbing characteristics. The dual material wheel is also claimed to be esthetically pleasing. For the rigid material, polyvinylidene chloride and nylon are suggested. For the soft material, polyurethanes are suggested. It should be noted that polyvinylidene chloride, nylon and polyurethanes are each a family of polymers with sometimes vastly different properties and that the inventor does not disclose which type(s) would be suitable. The inventor does not disclose or teach how to deal with adhesion issues associated with said rigid and soft layers and does not teach how to deal with the issues surrounding gating, venting and sink. Most importantly, the author does not suggest the use of main-chain linear copolyetherester elastomers of the present invention.

Krishnan (U.S. Pat. No. 4,669,517) discloses a urethane-rubber composite wheel. No suggestion of using the copolyetherester elastomers of the present invention is given.

Heitfield (U.S. Pat. No. 4,070,065) discloses a molded plastic wheel formed with a thin annular grove. Polyurethane is the suggested material for such a wheel. No suggestion of using the copolyetherester elastomers of the present invention is given.

Hechinger (U.S. Pat. No. 4,208,073) discloses a composite skateboard or skate wheel containing both a high and low coefficient of friction material. The material for the lower coefficient of friction is suggested as urethane and the material with a higher coefficient of friction is suggested as rubber. No suggestion of using the copolyetherester elastomers of the present invention is given.

Williams (U.S. Pat. No. 4,040,670) discloses a injection molded two component wheel composed of a rigid core that is overmolded by a soft material. Preferred materials for the core are cellulose acetate butyrate and preferred materials for the softer outer layer are polyurethanes. No suggestion of using the copolyetherester elastomers of the present invention is given. Furthermore, the suggested polyurethane does not appear to work adequately as a slow speed wheel composition.

Hoeschele (*Polymer Science* and *Engineering*, No. 12, Vol. 14, p. 848, 1974) broadly discloses copolyetherester elastomers wherein the polyether is polytetramethylene ether glycol. He further suggests that that they may be useful for tubing, sheet and roto-molded tires. He does not suggest the copolyetheresters of the current invention. The suggested copolyetherester does not appear to work adequately as a slow speed wheel composition.

Wolfe (*Rubber Chemistry & Technology* No. 4, Vol. 50, p. 688, 1977) discloses structure-property relationships for a variety of copolyetheresters wherein the polyether is polytetramethylene ether glycol, polyethylene glycol, polypropylene glycol and ethylene oxide-capped polypropylene (oxide). Wolfe does not suggest applications for said copolyetheresters.

Brown (*Rubber Industry*, p. 102, June 1975) broadly discloses copolyetheresters wherein the polyether is polytetramethylene ether glycol. He also discloses blends of said copolyetheresters with polybutylene terephthalate (PBT) and polyvinyl chloride. In addition, he suggests that the said copolyetheresters may be useful in autos, trucks, mobile homes, construction and off-road equipment and utility and recreational vehicles. He further suggests tubing, hoses, wire and cable jacketing, seals and gaskets. He does not suggest using said copolyetheresters in slow speed wheels. The suggested copolyetherester (based on tetramethylene ether glycol) does not appear to work adequately as a slow speed wheel composition.

Copolyetheresters are well known in the art. They can be prepared by known methods or they can be purchased from several manufacturers, including Dupont under the name Hytrel® or from DSM under the name Arnitel®. Below in TABLE 2 is much of the art that describes the preparation and some of the suggested uses of copolyetheresters.

Many attempts have been made to prepare high performance slow speed wheels using conventional thermoplastic processing techniques such as injection molding. Most have not enjoyed commercial success because it comes down to material. Most materials are not suitable for making thermplastically processed wheels. Quite simply, all materials are not created equal.

TABLE 2

| US PATENT NUMBER/PUBLICATION | INVENTOR/AUTHOR | YEAR | DISCLOSED |
| --- | --- | --- | --- |
| 3,763,109 | Witsiepe | 1973 | elastomeric copolyesters |
| 3,766,146 | Witsiepe | 1973 | elastomeric copolyesters |
| 3,651,014 | Witsiepe | 1972 | elastomeric copolyesters |
| 3,723,569 | Hoeschele | 1973 | blends of elastomeric copolyesters with cured epoxy resins |
| PolymerScience No. 42, 727–740 | Cella | 1973 | morphology of elastomeric copolyesters |
| 3,801,547 | Hoeschele | 1974 | solid phase polycondensation of copolyesters |
| 3,917,743 | Schroeder el al. | 1975 | elastomeric copolyesters blends |
| 3,963,800 | Gipp et al. | 1976 | elastomeric copolyesters |
| RE 28,982 | Crawford et al. | 1976 | blends of elastomeric copolyesters with polyvinyl chloride polymers |
| 3,718,715 | Crawford et al. | 1973 | blends of elastomeric copolyesters with polyvinyl chloride polymers |
| RubberChemistry, Vol. 50, No. 4, 688–703 | Wolfe, Jr. | 1977 | structure-property relationships of copolyesters wherein the soft segment is derived from polytetramethylene ether glycol, PPG, PEO, and EO-PPG |
| 4,124,570 | Scheibelhoffer el al. | 1978 | poly(neopenyl terphthalate/trimellitate) thermosetting resin |
| 4,205,158 | Hoeschele | 1980 | elastomeric copolyesters wherein soft segment is derived from an ethylene oxide-capped polypropylene glycol; branching agent used |
| 4,251,652 | Tanaka et al. | 1981 | elastomeric copolyesters wherein soft and hard segments have enhanced compatibility |
| 4,328,333 | Barbee et al. | 1982 | elastomeric copolyesters wherein soft segment is derived from a high molecular weight polypropylene glycol |
| 4,687,275 | Zeilstra et al. | 1987 | elastomeric copolyesters wherein soft segment is derived from an ethylene oxide-capped polypropylene glycol; branching agent used |
| 4,970,275 | Still et al. | 1990 | elastomeric copolyesters |
| Poly. Eng. & Sci., Vol. 14, No. 12, 848–852 | Hoeschele | 1974 | copolyetheresters wherein polyether is polytetramethylene ether glycol |
| RubberIndustry, June, 102–106 | Brown | 1975 | properties of copolyetheresters wherein polyether is polytetramethylene ether glycol and blends with PBT and PVC; suggested uses for said copolyetheresters |

PPG is an abbreviation for polypropylene glycol
PEO is an abbreviation for polyethylene oxide
EO-PPG is an abbreviation for ethylene oxide-capped polypropylene glycol
6

SUMMARY OF THE INVENTION

Suitable slow speed wheel compositions should be wear resistant, have resiliency, bounce and offer a "good ride." Since a "good ride" is subjective and will vary from individual to individual, such a wheel composition should be modifiable to suit individual needs. It should come in a variety of hardness ranges and should react well to imperfections in the riding surface.

We have discovered a slow speed wheel with high abrasion resistance, good riding attributes and excellent bounce fabricated from a composition comprising at least 20 wt % of a segmented thermoplastic copolyester or a blend of copolyesters consisting of essentially of a multiplicity of recurring long chain ester units and short chain ester units joined head-to-tail through ester linkages, said long chain ester units being represented by the formula (A):

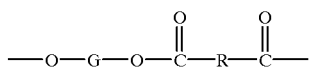

and said short chain units being represented by the formula (B):

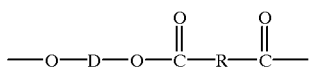

wherein
said short chain ester units make up between about 10 to about 95 wt % of said copolyester or blend of copolyesters; and
G is a divalent radical remaining after the removal of terminal hydroxyl groups from a polyether glycol copolymer based on poly(propylene oxide) and poly(ethylene oxide); said polyether having a number average molecular weight of about 600–5000,
R is a divalent radical remaining after removal of carboxyl groups from a aromatic dicarboxylic acid having a molecular weight of less than about 300 or mixtures thereof;
D is a divalent radical remaining after the removal of hydroxyl groups from a diol having a molecular weight of less than about 250 or mixtures thereof.

Another embodiment of the present invention includes a method of preparing this said segmented thermoplastic copolyester or a blend of copolyesters with the addition of fillers for improving wear properties, slip properties, changing wheel density and for improved processing.

Another embodiment of the present invention includes a method a of preparing this said segmented thermoplastic copolyester or a blend of copolyesters utilizing slip agents to improve wear properties and change slip or sliding properties of wheel to the liking of the individual.

Another embodiment of the present invention includes a method a of preparing this said segmented thermoplastic copolyester or a blend of copolyesters utilizing tackifying agents to change the slip properties of the surface of the wheel to suit the individual.

Another embodiement of the present invention includes a method a of preparing this said segmented thermoplastic copolyester or a blend of copolyesters utilizing other plastics (thermoplastic and/or thermoset) to modify the hardness of the wheel to suit the individual.

Another embodiement of the present invention includes a method a of preparing this said segmented thermoplastic copolyester or a blend of copolyesters with anti-oxidants to improve the color fastness, increase the useful lifetime of the wheel and to reduce thermal degradation during processing operations.

Another embodiement of the present invention includes a method a of preparing this said segmented thermoplastic copolyester or a blend of copolyesters with UV-stabilizing agents to improve the color fastness and to increase the useful lifetime of the wheel.

Another embodiement of the present invention includes a method a of preparing this said segmented thermoplastic copolyester or a blend of copolyesters utilizing foaming agents to modify the slip of the wheel, wear of wheel, surface texture of the wheel, bounce of the wheel and to reduce sink marks.

And yet another embodiment of the present invention includes a method a of preparing this said segmented thermoplastic copolyester or a blend of copolyesters utilizing an overmolding operation wherein a different material is used for the core and present said material is overmolded to change the bounce or other properties of the wheel, reduce weight, reduce cost or to lower net cycle time.

An object of the present invention is to provide a wheel that overcomes the shortcomings of the prior art described above.

Another object of the present invention is to provide thermoplastically processable slow speed wheels with improved ride attributes such as degree of slip, bounce, hardness and shock-absorbing attributes.

Another object of the present invention is to teach the proper injection molding of such wheels.

Yet another object of the present invention is to teach the overmolding of a core with the said material.

These and other objects will become evident from the following:

BRIEF DESCRIPTION OF THE DRAWINGS

Figures are used to illustrate the concept of the invention and show only several aspects of the invention.

Figures are used to illustrate the concept of the invention and show only several aspects of the invention. Different sizes and scales are possible. Other wheels are within in the claims of the present invention, including, but not limited to four-wheeled skate wheels, motorized skateboard wheels, luggage wheels, appliance wheels, shopping cart wheels and the like.

DETAILED DESCRIPTION OF THE PRESENT INVENTION

By slow speed wheel, we mean a wheel designed for moving a device, with or without person, at a continuous speed of less than about 30 miles per hour. Short amounts of time of between about 1 minute to about 5 minutes to about 60 miles per hour are within the definition. For example, skateboards with person are typically traveling less than about 15 miles per hour. However, during extreme downhill racing, high speeds of up to 60 miles per hour can be reached for a short duration. Clearly then, included within this definition are skate wheels, skateboard wheels, in-line skate wheels, motorized skateboard wheels, luggage wheels, shopping cart wheels and the like.

Figure 1:
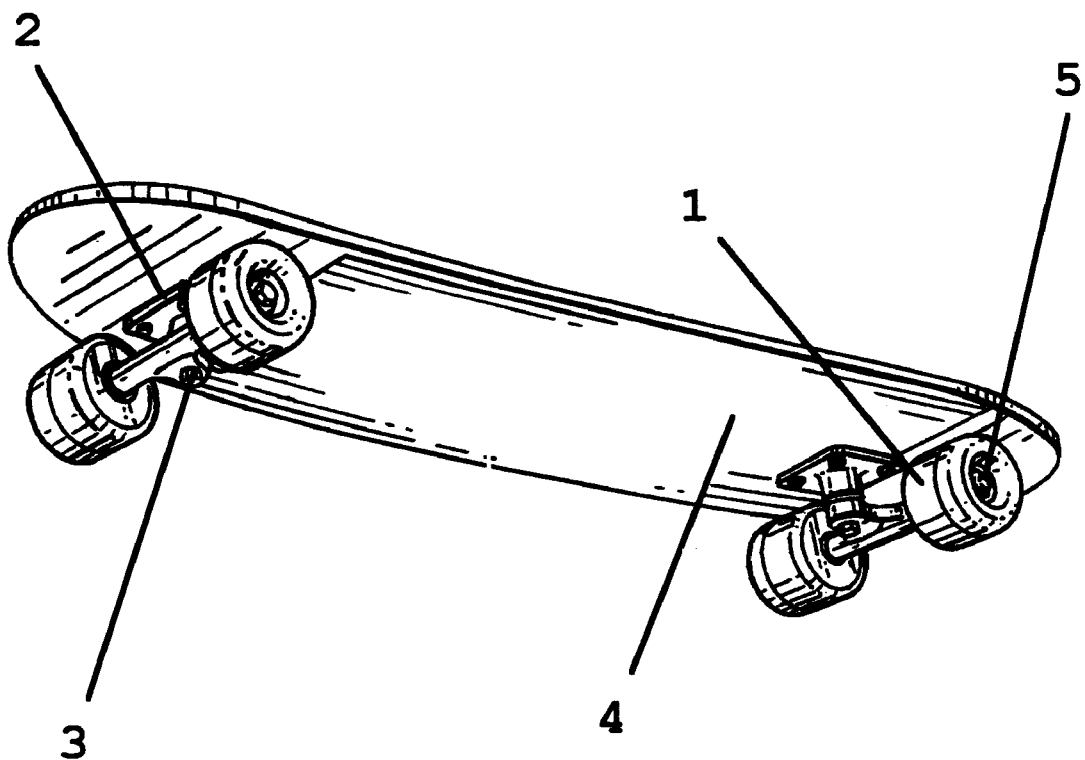
FIG. 1. BASIC COMPONENTS OF A SKATEBOARD. A perspective view of the basic components of a skateboard, including wheel(1), truck mount(2), adjustable truck(3), board(4) and axle with bearing(5).
Figure 2:
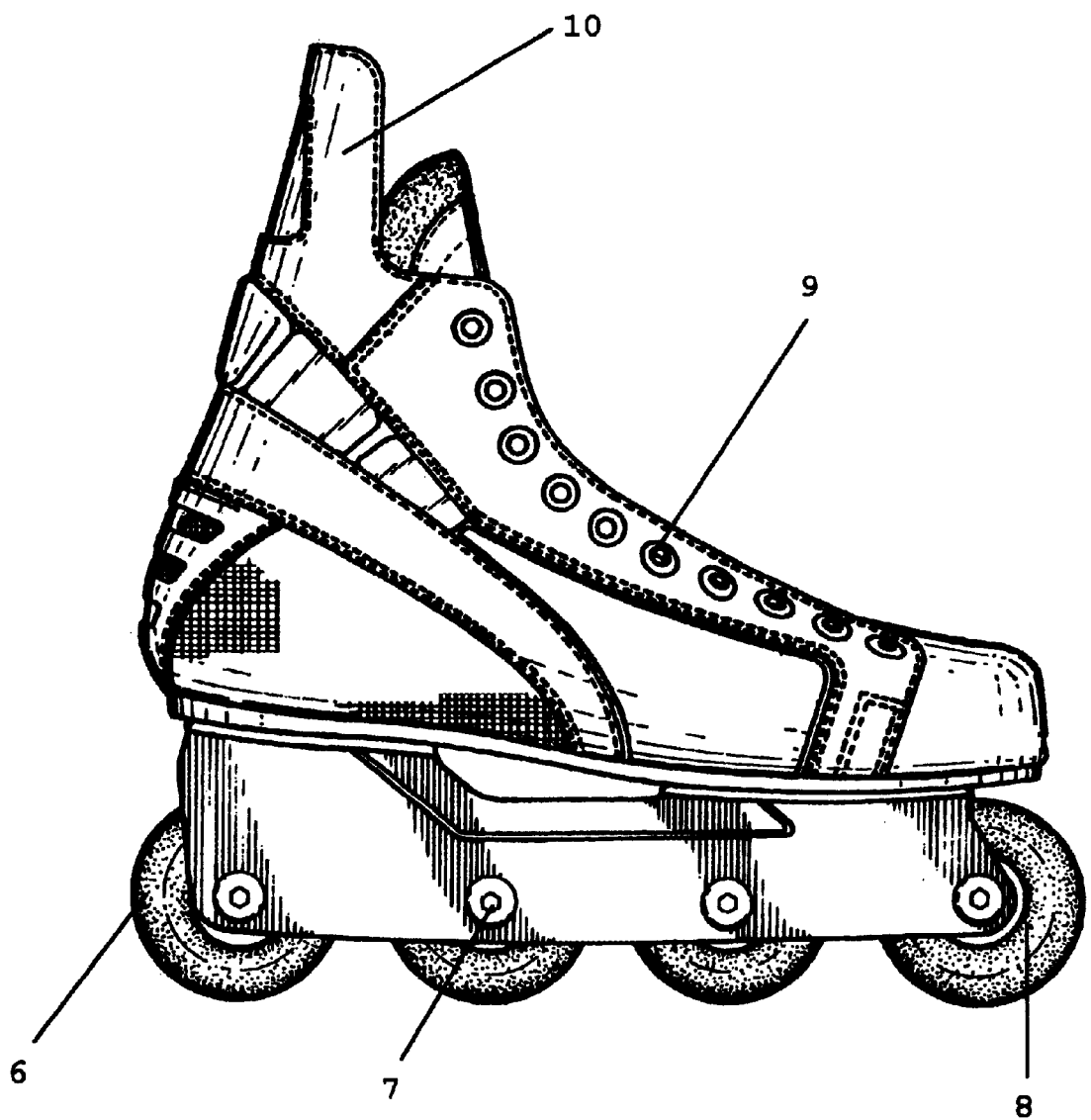
FIG. 2. BASIC COMPONENTS OF AN IN-LINE SKATE. A side view of a typical right foot in-line skate, including wheel(6), axle with bearing(7), hub(8), boot tightening device(9) and boot(10).
Figure 3:
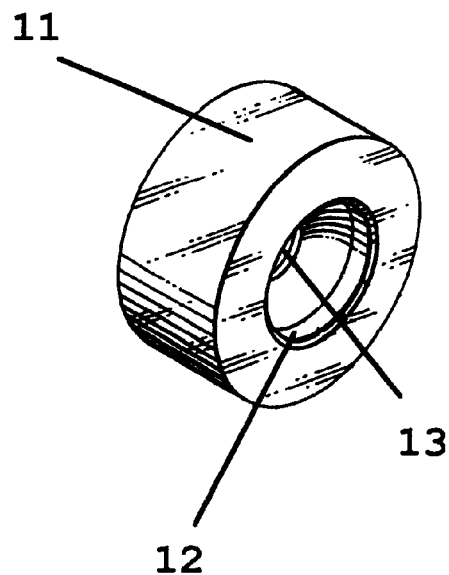
FIG. 3. PERSPECTIVE VIEW OF A TYPICAL SKATEBOARD WHEEL. A perspective view of a typical skateboard wheel showing wheel showing wheel(11), bearing surface(12) and axle orifice(13).
Figure 4:
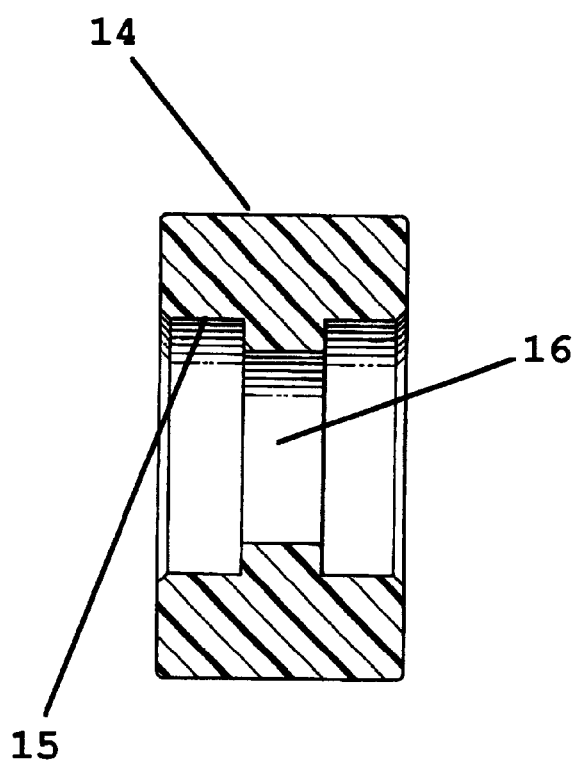
FIG. 4. CROSS SECTIONAL VIEW OF A TYPICAL SKATEBOARD WHEEL. Cross sectional view of a the typical skateboard wheel shown in FIG. 3, showing wheel surface(14), bearing surface(15) and axle orifice(16).
Figure 5:
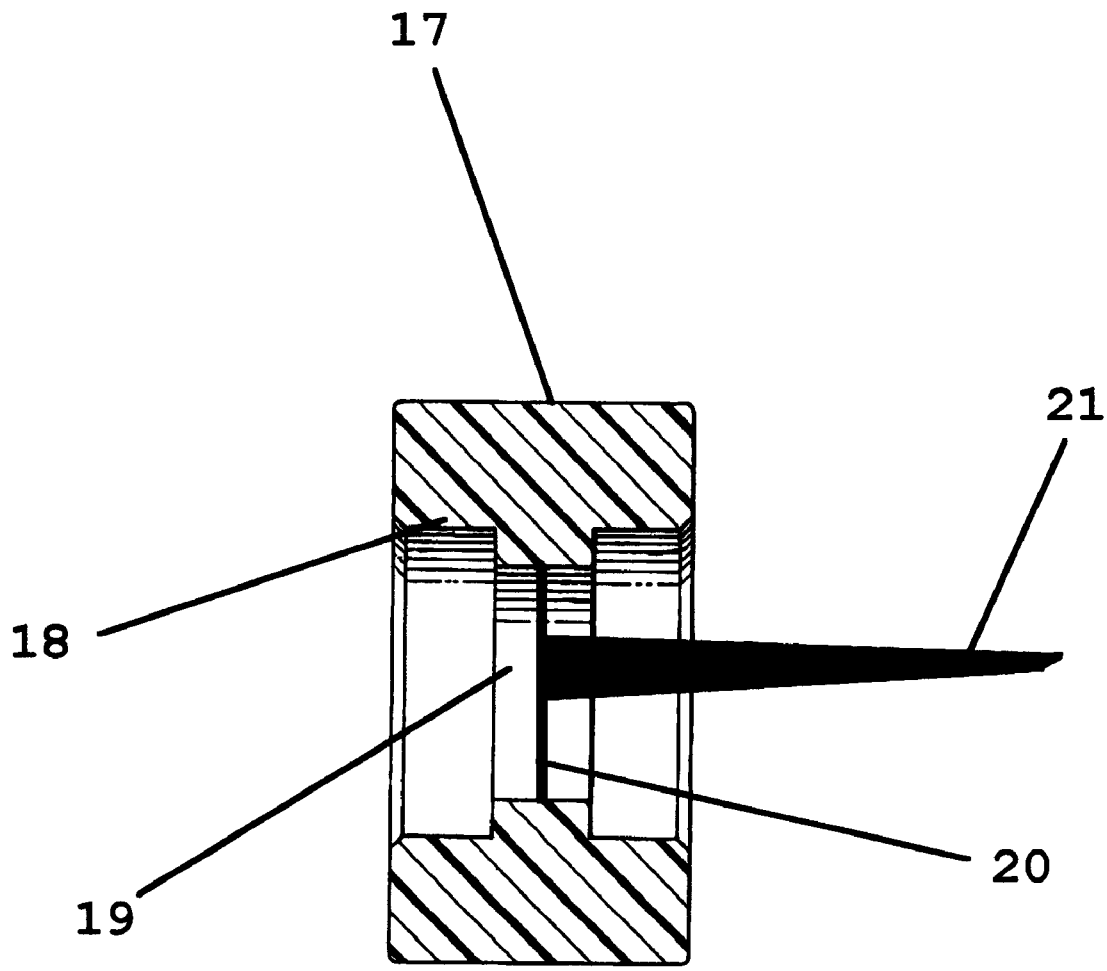
FIG. 5. CROSS SECTIONAL VIEW OF A TYPICAL SKATEBOARD WHEEL SHOWING SPRUE AND SPRUE GATE. Cross sectional view of a the typical skateboard wheel shown in FIG. 4, showing wheel surface(17), bearing surface(18), axle orifice(19), sprue gate(20) and sprue(21).
Figure 6:
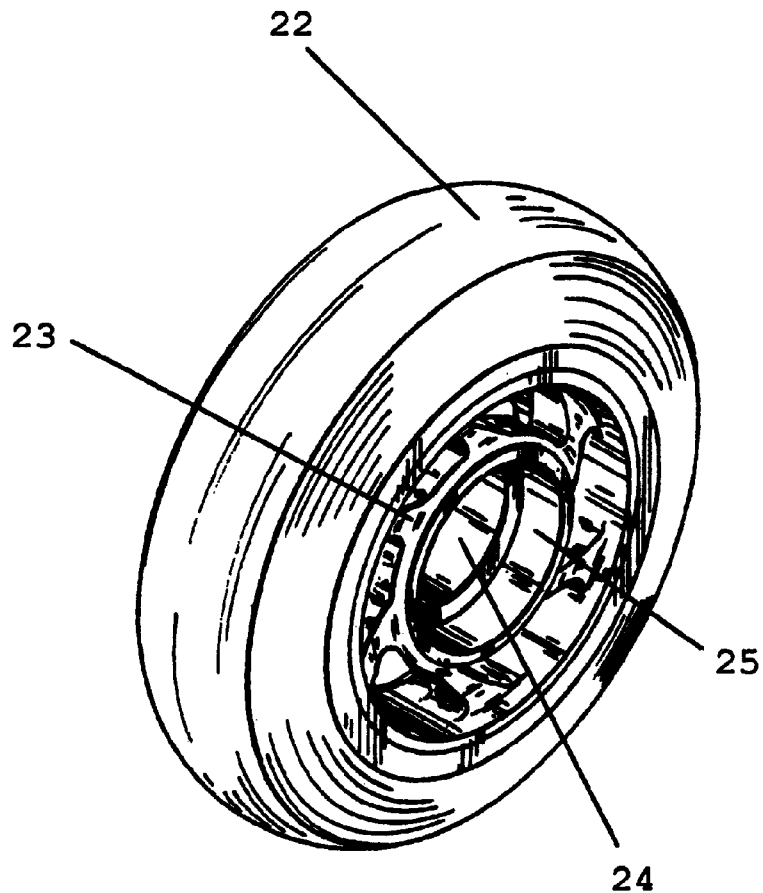
FIG. 6. PERSPECTIVE VIEW OF A TYPICAL IN-LINE SKATE WHEEL. Perspective view of a typical in-line skate wheel, showing wheel(22), hub(23), axle orifice(24) and bearing surface(25).
Figure 7:
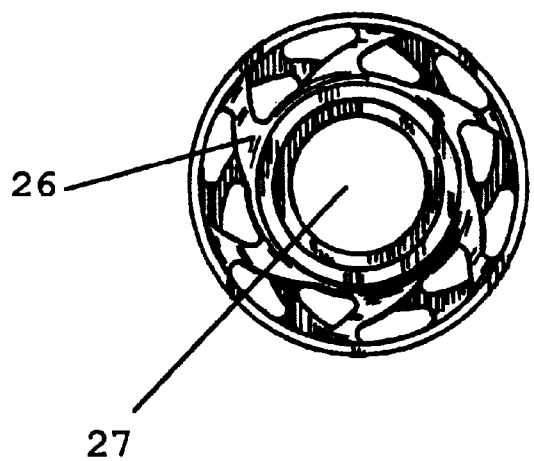
FIG. 7. VIEW OF A TYPICAL IN-LINE SKATE WHEEL HUB. Side view of hub shown in FIG. 6, showing hub(26) and axle orifice(27).
Figure 8:
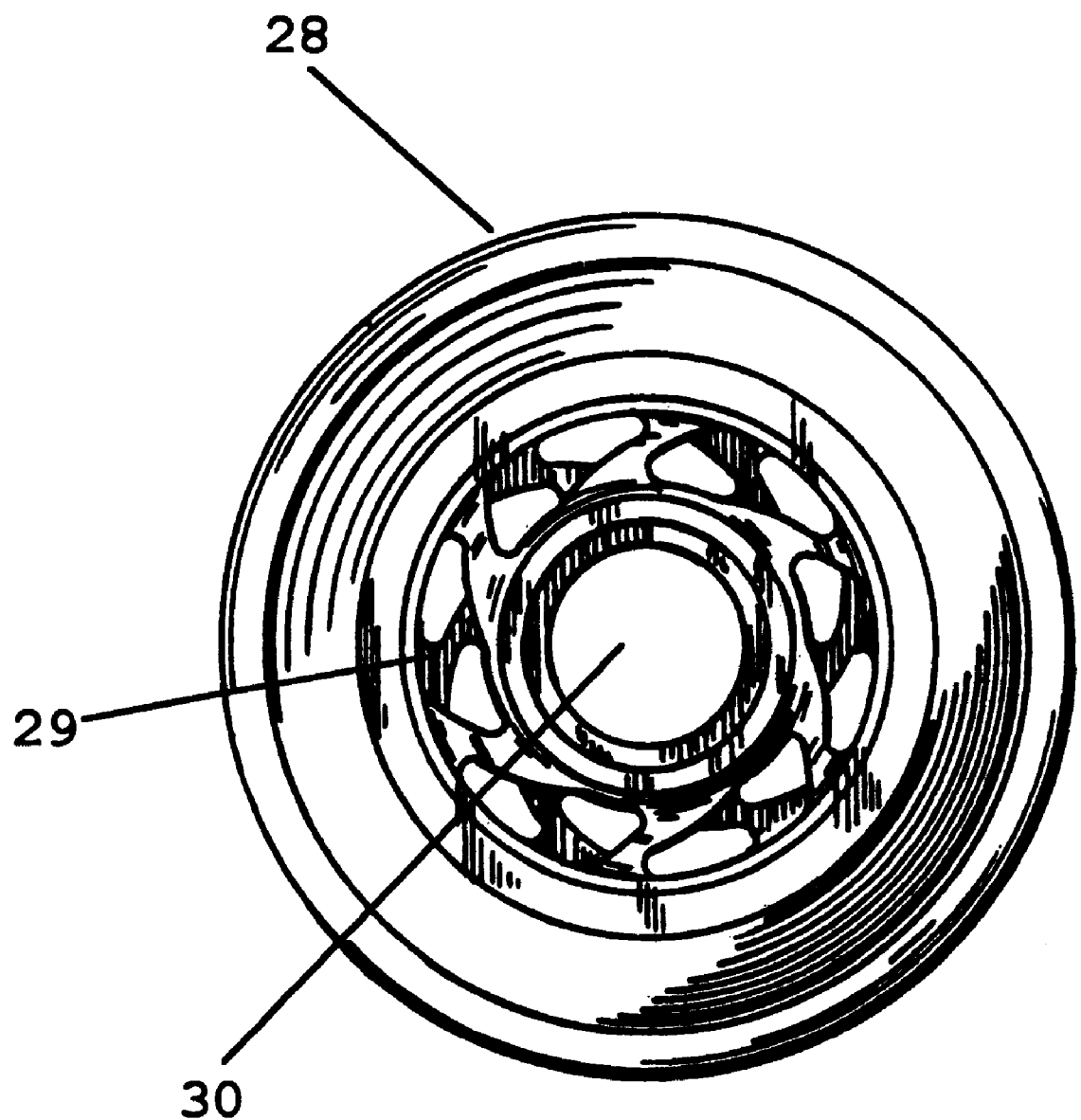
FIG. 8. VIEW OF A TYPICAL IN-LINE SKATE WHEEL HUB OVERMOLDED TO COMPLETE WHEEL. Side view of the typical complete in-line skate wheel shown in FIG. 6, showing wheel surface(28), hub(29) and axle orifice(30).

The slow speed wheels of the present invention are suitable for skateboard wheels 1 as shown in FIG. 1 and in-line skate wheels 6 as shown in FIG. 2. They are also suitable for, but not limited to, four-wheeled skates, motorized skateboards, luggage wheels, appliance wheels, shopping cart wheels and the like. The wheels of this present invention are substantially round in nature so as to be able to roll. Microscopically, the surface of the wheel may be textured or relatively smooth. They may have an axle orifice 13 as shown in FIG. 3. They may be substantially solid as shown in FIG. 4 or they can have a cellular structure. They can be thermoplastically processed, for example, by injection molding. If injection molded, a variety of situations are possible. They can be sprue gated 20 as shown in FIG. 5, or they can be gated into a sidewall. The wheels can be overmolded onto a hub 23 as shown in FIG. 6 and FIG. 8. Gating on the overmolded portion can be side gating or sprue gating into axle orifice 27 as shown in FIG. 7, said composition flowing through hub to the outside (not shown). The wheels can be a variety of sizes, widths and colors. Secondary operations can be performed on said wheels such as, but not limited to, machining, hot stamping, texturizing and others.

The slow speed wheel of the present invention with high abrasion resistance, good riding attributes and excellent bounce is fabricated from a composition comprising at least 20 wt % of a segmented thermoplastic copolyester or a blend of copolyesters consisting of essentially of a multiplicity of recurring long chain ester units and short chain ester units joined head-to-tail through ester linkages, said long chain ester units being represented by the formula (A):

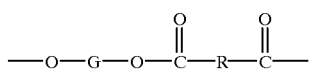

A and said short chain units being represented by the formula (B):

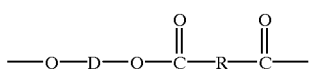

B wherein
said short chain ester units make up between about 10 to about 95 wt % of said copolyester or blend of copolyesters; and
G is a divalent radical remaining after the removal of terminal hydroxyl groups from a polyether glycol copolymer based on poly(propylene oxide) and poly(ethylene oxide); said polyether having a number average molecular weight of about 600–5000,
R is a divalent radical remaining after removal of carboxyl groups from a aromatic dicarboxylic acid having a molecular weight less than about 300 or mixtures thereof;

D is a divalent radical remaining after removal of hydroxyl groups from a diol having a molecular weight of less than about 250 or mixtures thereof.

Preferred copolyesters or blend of copolyesters are further characterized by a flexural modulus (73° F.) of from about 1000 to about 150,000 psi, a hardness (73° F.) from about 15 to about 70 Shore D, an elongation at break (73° F.) from about 75 to about 1000%, a melting point from about 250 to about 440° F., a brittle point of less than about 32° F. and a 24 hr water absorption (73° F.) of less than 15 wt %.

24 Hr water absorption is measured using ASTM D 570, brittle point is measured using ASTM D 746, coefficient of friction is measured using D1 894 and/or D3028, elongation at break is measured using ASTM D 638, flexural modulus is measured using ASTM D 790, shore D hardness is measured using ASTM D 2240 and melting point is measured using ASTM D 3418.

In addition, preferred copolyesters or blend of copolyesters having good processing characteristics and physical properties should have a melt flow rate below about 250 and above about 0.1 g/10 min. The MFR should be below about 250 because lower molecular weight polymers are difficult to process. In addition, low molecular weight copolyetheresters or blend of copolyesters can exhibit less than adequate mechanical properties which could lower abrasion resistance and riding properties of the slow speed wheel. MFR should be above about 0.1, since compositions below this are difficult to process due to high viscosity. MFR is measured using ASTM D1238, using 374° F. and 2.16 kg weight when said copolyesters or blend of copolyesters have a melting point of between about 250° F. to about 350° F. or by using 446° F. and 2.16 kg weight when said copolyesters or blend of copolyesters have a melting point of between about 350° F. to about 440° F.

If the slow speed wheel composition contains too little of said segmented thermoplastic copolyester or a blend of copolyesters, the useful properties such as abrasion resistance, and ride quality can be diminished. The preferred composition has from about 40 to about 100 wt % of said segmented thermoplastic copolyester or a blend of copolyesters. The most preferred composition has from about 90 to about 100 wt % of said segmented thermoplastic copolyester or a blend of copolyesters.

A substantially single copolyester is most preferred. Blends of said copolyesters may be utilized, but are less preferred. If blending of said segmented thermoplastic copolyester is used, the melting points of the substantially single copolyesters should be matched within 15° C., more preferably within 10° C. or cycle time of said blend can be adversely effected. Copolyesters of vastly different structures, for example, structures with vastly different polyether molecular weight can cause melt phasing or cause a decrease in the crystallinity of the polyether phase of blend resulting in lower than adequate mechanical properties and a longer cycle or polymer set up time. See, for example, Schroeder et al. in U.S. Pat. No. 3,917,743.

The term "long chain ester units" as applied to units in a polymer chain refers to the reaction product of a long chain glycol with a dicarboxylic acid or ester forming equivalent. Such "long chain ester units," which are a repeating unit in the copolyesters of this invention correspond to formula A above. The long chain glycols are polymeric glycols having terminal (as terminal as possible) hydroxy groups.

The term "short chain ester units" as applied to units in a polymer chain refers to the reaction product of a short chain glycol with a dicarboxylic acid or ester forming equivalent. Such "short chain ester units," which are a repeating unit in the copolyesters of this invention correspond to formula B above. The short chain glycols are glycols having terminal (as terminal as possible) hydroxy groups.

The term "consisting essentially of" is intended to include small amounts of other acids or glycols, e.g., up to about 7.5 wt %. If more than about 7.5 wt % of said other acids or glycols are used, mechanical properties and, thus, riding attributes may be adversely affected. Said copolyesters may also contain an effective amount of a branching agent. Typically, from about 1 to about up to 6 equivalents per 100 moles of dicarboxylic acid or its ester forming equivalent of a branching agent are used, said branching agent having a functionality of 3–6. The branching agent can be represented by the formula $(HO)_aX(COOH)_b$ where X is a polyfunctional radical a=0–6, b=0–4, and the sum of a+b=3–6. Said branching agent may be polymeric. Representative polyols include glycerol, trimethylol propane and long chain ethers initiated with polyfunctional initiator. Representative polycarboxylic acids include branching agents such as hemimellitic or trimellitic acid, trimesic and the like. The anhydride or ester of the above acids may be used. Representative hydroxy acid branching agents include malic acid, citric acid and the like. Especially preferred branching agents include trimellitic anhydride, trimesic acid and the like. If more than an effective amount of branching agent is used, polymers with extremely high viscosity or polymers that are crosslinked and cannot be thermoplastically processed may be obtained. See, for example, Scheibelhoffer et al. in U.S. Pat. No. 4,124,570, Hoeschele in U.S. Pat. No. 4,205,158 and Zeilstra et al. in U.S. Pat. No. 4,687,835.

Short chain ester units preferably make up between about 10 to about 95 wt % of said copolyester or blend of copolyesters. More preferably between about 20 to about 80 wt %. Most preferably between about 25 and 70 wt %. Too little short chain ester units (less than 10 wt %) cause the resulting material to be too soft and lack appropriate mechanical properties and, in addition, make polymer set up time too long. Too much short chain ester units (greater than 95 wt %) case resulting material to be too hard and not elastic enough to have desired mechanical properties.

Preferred polyether glycol copolymer is based on poly (propylene oxide) and poly(ethylene oxide), said polyether having a number average molecular weight of about 600–5000. Ethylene oxide content should be between about 5 to about 50 weight percent. At higher ethylene oxide contents, the resulting copolyetheresters exhibit excessive water swell, while at lower ethylene oxide content, melt phasing can occur during the melt condensation. Polymerization difficulties can arise when random block copolymers are used as the resulting polyether glycols have both primary and secondary alcohol end groups which react with dicarboxylic acid or ester forming equivalent at different rates. Polyether glycol copolymers are widely known in the art and are available from a variety of manufacturers such as BASF.

Most preferred polyether glycol copolymer is a copolymer based on poly(propylene oxide) and poly(ethylene oxide) where said polyether glycol is an ethylene oxide-capped poly(propylene oxide) glycol wherein the ethylene oxide content of the ethylene oxide-capped poly(propylene oxide) glycol is between about 5 to about 50 wt %. More preferably, the ethylene oxide content is between about 5 to about 25 wt %. At higher ethylene oxide contents, the resulting copolyetheresters exhibit excessive water swell while at lower ethylene oxide content melt phasing can occur during the melt condensation polymerization. Melt phasing can lower the mechanical properties of said polyetherester and, thus, lower ride attributes of the slow speed composition. Also, it is necessary that the glycol have a number average molecular weight of from about 600 to about 5000 because at a lower molecular weight, the setup rate of the resulting copolyetherester is slow which will increase cycle time of molded part. At a higher molecular weight, process difficulties during the polymer preparation such as phasing are encountered and polymers can become exceeding viscous and shear sensitive. Most preferred number average molecular weight range is from about 600 to about 3500. The preparation of ethylene oxide-capped poly (propylene oxide) is well known in the art. One preparation calls for the glycol to be prepared by condensation of propylene oxide with propylene glycol or water in the presence of a basic catalyst to form a poly(oxypropylene) homopolymer, which is then reacted with ethylene oxide to obtain the copolymer. Many sources exist for ethylene oxide-capped poly(propylene oxide) glycol. For example, Pluronic® brand polyether glycol is available from BASF. Number average molecular weights are measured relative to monodisperse polyethylene glycol standards using gel permeation chromatography (GPC). The polydispersity of the standards should be less than about 1.2. Standards are commercially available from many suppliers, including Polysciences, Inc., Warrington, Pa.

Aromatic dicarboxylic acids or ester forming equivalents include, but are not limited to, terphthalic acid, isophthalic acid, phthalic acid, 2,6-naphthalenedicarboxylic acid or mixtures thereof. Preferred dicarboxylic acids are terphthalic acid, isophthalic acid, phthalic acid or mixtures thereof. Most preferred are terphthalic acid and isophthalic acid or blends thereof.

Preferred diols having a molecular weight of less than 250 are 1,4-butanediol, 1,5-pentanediol and 1,6-hexanediol or blends thereof. Most preferred is 1,4-butanediol.

Preferred 24 hr water absorption is less than about 15 wt %. Most preferred 24 hr water absorption is of less than about 10 wt %. Too much water absorption can swell copolyester and reduce mechanical properties and the resulting riding attributes of the slow speed wheel composition.

The preparation of the copolyetherester described herein is well know in the art. See, for example, TABLE 2 above. In general, the copolyetheresters described herein are made by a conventional ester interchange reaction, in the presence or absence of branching agent, and in the presence of catalyst. Typically, an antioxidant is incorporated into the copolyetherester, usually added before polymerization with the monomers. If it is desired, a photostabilizer can also be added along with the antioxidant. Alternate esterification or ester interchange processes are possible. For example, said long chain glycol can be reacted with a high or low molecular weight short chain ester homopolymer or copolymer in the presence of catalyst until randomization occurs.

A typical procedure for preparing the copolyetherester involves heating the dimethyl ester of the appropriate aromatic dicarboxylic acid or mixture of acids with the ethylene oxide-capped poly(propylene oxide) glycol and a molar excess of 1,4-butanediol in the presence or absence of up to 6 equivalents per 100 moles of appropriate acid or ester-forming equivalent branching agent. The reaction is conducted in the presence of a catalyst such as tetrabutyl titanate at about 150–260° C., while distilling off methanol formed by the ester interchange. This procedure results in the formation of a low molecular weight prepolymer which can be carried to a high molecular weight copolyetherester by distillation of 1,4-butanediol. The second process stage is known as polycondensation. Additional ester interchange occurs during this polycondensation which serves to increase the molecular weight and to randomize the arrangement of the long and short chain ester units. For best results, this final distillation or polycondensation is run at reduced pressure. Upon completion of this phase, molten copolyester is typically pelletized. If necessary to achieve desired copolyester of present invention, solid phase polymerization can be employed. This so called post condensation or solid phase polymerization is eloquently described by Hoeschele in U.S. Pat. No. 3,801,547 and U.S. Pat. No. 4,205,158. In addition, it is described by Zeilstra et al. in U.S. Pat. No. 4,687,835.

Another embodiment of the present invention includes a method of preparing this said segmented thermoplastic copolyester or a blend of copolyesters with the addition of fillers up to about 60 wt % for improving wear properties, dimensional stability, slip properties, changing wheel density and for improved processing. Appropriate fillers include, but are not limited to:

alumina;
aragonite clay;
barium sulfate;
bentonite clay;
calcite clay;
calcium carbonate;
calcium phosphates;
carbon black;
graphite
hydroxyapatites;
kaolin clay;
magnesium phosphate;
metal aluminosilicate complexes;
orthorhombic clays;
particles of rubber;
precipitated calcium carbonate;
rhombohedral clays;
silica xerogel;
silica;
silicon dioxide;
sodium aluminum silicates;
surface-modified clays;
synthetic apatites;
talc;
titanium dioxide;
zinc oxide;
zirconium silicate;
color-producing fillers;
combinations thereof.

Preferred particle size is from about 0.1 to about 200 $\mu$m. More preferably, from about 0.1 to about 100 $\mu$m. Most preferably, from about 0.1 to about 20 $\mu$m. Particles smaller than 0.1 $\mu$m are impractical, while particles bigger than 200 $\mu$m can cause poor part surface finish and a loss of mechanical properties and, thus, riding quality. Fillers can be added directly to the hopper, along with dispersing agents and coupling agents if desired or a concentrate of the filler can be added, said concentrate preferably containing a base of copolyester being utilized. Dispersing agents are utilized to aid in the mixing and dispersion of the filler in the composition. Preferred dispersing agents include, but are not limited to, calcium stearate and Acrawax C (N,N'-ethylenebisstearaniide made by Lonza). Coupling agents can also be useful in increasing the interaction between the filler and composition. Coupling agents are well known in the art. Some preferred coupling agents are epoxy silane, diamine silane, mercapto silane, cationic silane and titanates. Coupling agents may be applied at the hopper or used as a surface treatment to the appropriate filler.

Another embodiment of the present invention includes a method a of preparing this said segmented thermoplastic copolyester or a blend of copolyesters utilizing slip agents to improve wear properties and change slip or sliding properties of wheel to the liking of the individual. Slip agents are defined as any composition that lowers the coefficient of friction of the native composition. Slip agents are well known in the art and are used from about 0.05 to about 10 wt %. Preferred slip agents include, but are not limited to, Teflon®, silicones, ultra-high molecular weight polyethylene, Erucamide, N,N'-dioleoylethylenediamine, oleyl palmitamide, saturated fatty acid amides, stearyl erucamide and the like. If non-meltable particulate slip agents such as Teflon® and some silcones are used, preferred particle sizes range from about 0.1 to about 100 $\mu$m. Dispersing agents may be used for better dispersion of said slip agents. Said slip agents may be chemically or physically modified for better dispersion and interaction with copolyester. For example, said particulate slip agents may be partially oxidized prior to use to increase compatibility with said copolyetheresters.

Another embodiment of the present invention includes a method a of preparing this said segmented thermoplastic copolyester or a blend of copolyesters utilizing tackifying agents to change the slip properties of the surface of the wheel to suit the individual. Tackifying agents are defined as any composition that increases the coefficient of friction of the native composition. Tackifying agents are well known in the art and are used from about 0.05 to about 10 wt %. Preferred tackifying agents include, but are not limited to, Kraton®, oil-filled Kraton®, available from Shell Chemical Company and GLS Corporation, hydrogenated or unhydrogenated styrene-butadiene-styrene block copolymers, hydrogenated or unhydrogenated styrene-isoprene-styrene block copolymers, styrene-ethylene-butylene block copolymers which can be oil-filled and the like. Additional tackifying agents include waxes and rosins available from Resinall® Corporation and Goodyear.

Another embodiment of the present invention includes a method a of preparing this said segmented thermoplastic copolyester or a blend of copolyesters utilizing other plastics to modify the hardness of the wheel to suit the individual. Preferred plastics include Kraton® and oil-filled Kraton®, available from Shell Chemical Company, polyvinyl chloride and cured epoxy resins.

Another embodiment of the present invention includes a method a of preparing this said segmented thermoplastic copolyester or a blend of copolyesters with anti-oxidants to improve the color fastness, increase the useful lifetime of the wheel and to reduce thermal degradation during processing operations. Anti-oxidants are well known in the art and are used from about 0.1 to about 2 wt %. Anti-oxidants can be added after polymerization or, more preferably, during polymerization. Both arylamine and phenolic anti-oxidants may be used. Most preferred anti-oxidants include, but are not limited to, N,N'-hexamethylenebis(3,5-di-tert-butyl-4-hydroxyhydrocinnamamide), N,N'-trimethylenebis(3,5-di-tert-butyl-4-hydroxyhydrocinnamamide), 1,3,5-trimethyl-2,4,6-tris[3,5-di-tert-butyl-4-hydroxybenzyl]benzene and combinations thereof. Anti-oxidants are available from numerous suppliers including Ciba Geigy.

Another embodiment of the present invention includes a method a of preparing this said segmented thermoplastic copolyester or a blend of copolyesters with UV-stabilizing agents to improve the color fastness and to increase the useful lifetime of the wheel. UV-stabilizers are well known in the art and are used from about 0.1 to about 2 wt %.

UV-stabilizers include, but are not limited to carbon black and hindered amine photostabilizers. UV-stabilizers can be added after polymerization or, more preferably, during polymerization. A Preferred UV-stabilizer is bis(1,2,2,6,6-pentamethyl-4-piperidinyl)-n-butyl-(3,5-di-tert-butyl-4-hydroxylbenzyl)malonate.

Another embodiment of the present invention includes a method a of preparing this said segmented thermoplastic copolyester or a blend of copolyesters utilizing foaming agents to modify the slip of the wheel, wear of the wheel, surface texture of the wheel, weight of the wheel and to make wheel have different bounce properties. In addition, foaming agents can greatly reduce sink mark formation in thick sections of said wheel. Both endothermic and exothermic foaming agents may be utilized. Foaming agents are well known in the art and are used from about 0.1 to about 10 wt %. More preferably, from about 0.5 to about 5 wt %. Foaming agents include, but are not limited to azodicarbonamide and mixtures of citric acid and sodium bicarbonate. Foaming agents are usually blended into a polymeric resin carrier along with dispersing agents and agents to control cell formation and size. Dispersing agents and other additives are typically materials such as zinc stearate, zinc oxide, glycerol monostearate, dihydroxyaluminum sodium carbonate and polyethylene glycol distearate. Plastic carrier resin is typically low density polyethylene, oxidized low density polyethylene, waxes and others. Care should be taken to ensure carrier resin is compatible with the copolyester or blend of copolyesters of present invention, otherwise splay and delamination can be observed on parts. Foaming agents are available from Boehringer Ingelheim under the trade names Hydrocerol®, Exocerol® and Activex®. A useful foaming agent is Activex® 235. The foaming agents EX-127 and Hydrocerol® & BIH 25 both seemed somewhat incompatible with the copolyesters of the present invention as splay and delamination was observed when used.

If the wheel is to be injection molded, care should be taken to build the mold appropriately so as to eliminate sink, as the foaming agents mentioned above can only work and improve sink to a reasonable extent. For a single cavity mold system, we have found that a sprue gate (20, 21), as shown in FIG. 5, is convenient. This allows the molding composition to remain sufficiently molten to enter the mold cavity and completely pack out the part before the gate can freeze off In addition, a sprue gate allows for uniform roundness. If the gate freezes off before pack out, sink marks can appear which adversely affects the wheel performance and ride quality. The gate should be as large as convenient to reduce the likelihood of gate freeze off A large gate also minimizes shear and, thus, reduces thermal stress on the molding composition. Removal of the large gate is accomplished by a knife or a boring device. Such thermal stress can reduce the needed mechanical properties of said composition. Such a gating arrangement will be well understood by those in the art. Venting is accomplished by grinding slots between the sprue bushing and the core. Proper venting will reduce unsightly burn spots on the part that can reduce the aesthetic appearance of the wheel and may reduce needed mechanical properties. Mold temperature should be maintained high enough to keep the gate from freezing off, but low enough to minimize cycle time. On a 52 mm wheel and a gate thickness of approximately 0.150 in, mold temperatures of approximately 100° F. are adequate. For multi-cavity molds, a three-plate mold and a hot runner mold are found to be convenient for the same reasons as described above. All these mold systems are readily apparent to those trained in the art. To aid in the cooling of the ejected part, a chilled water bath or other suitable material may be utilized.

And yet another embodiment of the present invention includes a method a of preparing this said wheel composition utilizing an overmolding operation wherein a different material is used for the hub (26), as shown in FIG. 7, and present said material is overmolded to complete the wheel (22) as shown in FIG. 6 and FIG. 8. The hub and wheel shown in FIG. 7 and FIG. 8 are for illustrative purposes only and other systems are possible. For example, the hub could be solid or could have coring that would allow center gating via the axle orifice (27) for the overmold material. In addition, texture and other surfaces for mechanical bonding of the overmolded material to the hub may be utilized. This overmolding would be advantageous to change the bounce of the wheel, reduce the weight of the wheel, to change the ride of the wheel or to reduce the cost of the wheel. In addition, said overmolding can reduce the net cycle time needed to complete the wheel. In selecting the appropriate material for the hub, several factors need to be considered. First, the said composition should adhesively, or strongly mechanically bond to said hub. In addition, the hub material should be rigid enough to support the device and/or rider. This overmolding process can be carried out conveniently in a two stage process utilizing two molds, one for the hub and one for the overmold to complete the wheel. Suitable materials for the hub are polyesters such as PBT, rigid polyurethanes such as Isoplast®, nylons such as nylon 6 and nylon 66 and rigid polyvinyl chloride. For added stiffness and dimensional stability, fillers such as talc, calcium carbonate, kaolin, glass fiber and the like may be employed up to approximately 40 wt %. Numerous gating situation exist for the said hub and would be well known by someone skilled in the art. This cooled and shrunk hub can then be placed into a second mold for the overmold portion. Gating can be accomplished by injection into a side wall, or multiple locations along the side wall. Gating could also be accomplished by gating into the axle orifice (27) if the hub has the appropriate coring. For a multi-cavity system, a three-plate mold or a hot runner mold are found to be convenient. All these mold systems are readily apparent to those trained in the art. If adhesion is an issue, various adhesives may be applied directly to the hub before overmoldeding. In addition to the two mold process, a single stage process utilizing a single mold base with two different mold cavities and two molding machines can be used. This process in its numerous forms is often referred to as comolding.

Preferred copolyester or a blend of copolyesters are those described above that are produced by those methods described above and other methods generally known in the art. More conveniently, it is preferred to use those copolyesters that are commercially available that fall within the specification. Preferred commercially available copolyesters include, but are not limited to, Hytrel® G3548W, G4078W and G4774, available from Dupont and Arnitel® PL380, available from DSM. Not all grades of Hytrel® and Arnitel® are within the scope of the invention and do not contain the needed said long chain ester units functionality of a polyether glycol copolymer based on poly(propylene oxide)and poly(ethylene oxide).

The invention and manner of making and using the invention will be more fully appreciated from the following non-limiting, illustrative examples.

EXAMPLES

Not all examples shown are claimed in this present invention, but are for comparative purposes only.

TABLE 4 shows material molded, manufacturer of molded material, type of material molded, hardness, and general observations concerning ride, bounce, wear and resistance to puncture. TABLE 5 shows material molded, manufacturer of molded material, processing temperature profile, injection time/cool time, mold temperature and general comments regarding processing. All processing was performed on either a 60, 100 or 120 Ton Toshiba injection molding machine.

For brevity concerning TABLE 4 and TABLE 5, PEO is an abbreviation for polyethylene oxide (equivalent to polyethylene glycol), PPO is an abbreviation for polypropylene oxide (equivalent to polypropylene glycol), PTMG is an abbreviation for polytetramethylene ether glycol (equivalent to polyTHF), S-EB-S is an abbreviation for styrene-ethylene-butylene-styrene block copolymer, PE is an abbreviation for polyethylene, PP is an abbreviation for polypropylene, PEBA is an abbreviation for polyether-block-amide polymer, LLDPE is an abbreviation for linear low density polyethylene, POP is an abbreviation for polyolefin plasotomer.

Several points should be noted from TABLE 4. First, it should be noted that, generally speaking, copolyetheresters wherein the polyether is a PEO/PPO copolymer exhibited excellent ride, bounce, wear and resistance to puncture (examples 2,5,9,10,11,12,24,25 and 26). On the other hand, PTMG-containing copolyetherester exhibited much lower qualities (examples 4 and 8). Second, an obvious material to try would be the thermoplastic elastomer equivalents to the currently widely used crosslinked polyurethanes, but these materials do not exhibit a good quality ride and appropriate bounce (examples 17–20, inclusive). Finally, example 1 shows the importance of the balancing of melting points when using blends of copolyetheresters, as previously described. A mismatch in melting point can result in non-melt or long cycle times. Example 12 shows that the addition of plasticizers to higher melting point copolyetheresters can better balance melting points so that blending of copolyetheresters can be easily achieved.

Several points should be noted from TABLE 5. Most materials tested had longer cycle times than the polyetheresters of the present invention. Noted are the long cycle times of Pebax 3533 PEBA (example 15), polyurethanes (examples 17–20, inclusive) and Suryln® (example 22).

Examples 24–26, inclusive, show the need to properly select a foaming agent which is compatible with composition.

Many attempts have been made to prepare high performance slow speed wheels using conventional thermoplastic processing techniques such as injection molding. Most have not enjoyed commercial success because it comes down to material. Most materials are not suitable for making thermoplastically processed wheels. Based on the results shown in TABLE 4 and TABLE 5, it should be quite apparent that all materials are not created equal.

TABLE 4

| MATERIAL/ MANUFACTURER | TYPE OF MATERIAL[1] | HARDNESS[2] | RIDE[3] | BOUNCE[4] | WEAR, RESISTANCE TO PUNCTURES |
|---|---|---|---|---|---|
| 1. Hytrel G3548 75 wt %: 25 wt % Hytrel 5556/Dupont | Copolyetherester blend. G3548W polyether is PEO/PPO copolymer. 5556 polyether PTMG. | See TABLE 5 | Non-melt. See TABLE 5 | See TABLE5 | See TABLE5 |
| 2. Hytrel G4774 90 wt %: Dynaflex G6713-0001 10 wt % /Dupont, GLS Corporation | Copolyetherester/oil-filled S-EB-S copolymer blend. | <47D | Excellent | Excellent | Excellent |
| 3. Affinity SM 1300†/Dow | Polyolefin plastomer. | 94A | Very poor. Slow. Wheels get hot | Fair | Very poor |
| 4. Arnitel EL560†/DSM | Copolyetherester. Polyether is PTMG. | 55D | Fair Wheels get hot. | Excellent | Poor |
| 5. Arnitel PL380/DSM | Copolyetherester. Polyether is PEO/PPO copolymer. | 38D | Excellent | Excellent | Excellent |
| 6. ELY 60†/EMS-American Grilon | Nylon-12 based PEBA. | 63D | Fair Wheels get hot. | Good | Poor |
| 7. Engage SM 8400†/Dupont-Dow | LLDPE POP, octene modified. | 72A | Slow, smooth ride. | Fair | Very poor |
| 8. Hytrel 5556†/Dupont | Copolyetherester. Polyether is PTMG. | 55D | Fair Wheels get a little hot. | Excellent | Poor |
| 9. Hytrel G3538W/Dupont | Copolyetherester. Polyether is PEO/PPO copolymer. | 35D | Excellent | Excellent | Excellent |
| 10. Hytrel G4078W/Dupont | Copolyetherester. Polyether is PEO/PPO copolymer. | 40D | Excellent | Excellent | Excellent |
| 11. Hytrel G4774/Dupont | Copolyetherester. Polyether is PEO/PPO copolymer. | 47D | Excellent | Excellent | Excellent |
| 12. Hytrel G4774 with 5 wt % MB50-010 Silicone Additive in 63D Hytrel/ Dupont, Dow-Corning | Copolyetherester. Polyether is PEO/PPO copolymer. | 47D | Excellent | Excellent | Excellent |
| 13. Kraton D-1102†/Shell Chemical | S-B-S Colypolymer. | 60A | Very poor. Too Soft. | Excellent | Very Poor |
| 14. MXL80A01NAT†/ Montell | Vulcanate. PP carrier. (uncertain) | 80A | Fair. Too soft. | Good | Very poor |
| 15. Pebax 3533†/Elf Atochem | Nylon-12 based PEBA. Polyether is PTMG. | 35D | Fair. Rough. Wheels get hot. | Fair | Poor |
| 16. Pebax 4033†/Elf Atochem | Nylon-12 based PEBA. Polyether is PTMG. | 40D | Fair. Rough. Wheels get hot. | Fair | Poor |
| 17. Pellethane 2102-85A†/Dow | Polyetherpolyurethane. | 85A | Fair. Flat | Poor | Good |
| 18. Pellethane 2103-90A†/Dow | Polyetherpolyurethane. Polyether is PTMG. | 90A | Fair. Flat | Poor | Good |
| 19. Pellethane 2103-95AE†/Dow | Polyetherpolyurethane. Polyether is | 95A | Fair. Flat | Poor | Good |

TABLE 4-continued

| MATERIAL/ MANUFACTURER | TYPE OF MATERIAL[1] | HARD-NESS[2] | RIDE[3] | BOUNCE[4] | WEAR, RESITANCE TO PUNCTURES |
|---|---|---|---|---|---|
| 20. Pellethane 2355-95AE†/Dow | PTMG. Polyetherpolyurethane. | 95A | Fair. Flat | Poor | Good |
| 21. Santoprene 70A†/Advanced Elastomer Systems | Vulcanate. PP carrier. | 70A | Very poor. Too soft. | Good | Very Poor |
| 22. Suryln 8920†/Dupont | Ionomer | 40D | Poor. Very flat. | Poor | Good |
| 23. XLX XE3106†/EMS American Grilon | Nylon-6 based PEBA. | 33D | Good. Somewhat rough. | Good | Fair |
| 24. Arnitel PL380 with 1 wt % BIH 25 Foaming Agent/DSM, BI | Copolyetherester. Polyether is PEO/PPO copolymer. | 38D | Excellent | Excellent | Excellent |
| 25. Arnitel PL380 with 1 wt % EX-127 Foaming Agent/DSM, BI | Copolyetherester. Polyether is PEO/PPO copolymer. | 38D | Excellent | Excellent | Excellent |
| 26. Arnitel PL380 with 1 wt % ACT-235 Foaming Agent/DSM, BI | Copolyetherester. Polyether is PEO/PPO copolymer. | 38D | Excellent | Excellent | Excellent |

Data for 52 mm solid, single component wheel like shown in FIG.3 and spruc-gated as shown in FIG.4.
†Comparative examples only-not claimed in patent.
[1]As given by manufacturer or by analysis.
[2]As given by manufacturer or by measurement on molded part after conditioning.
[3]Qualitative feel of ride quality.
[4]Qualitative measurement of rebound as measured by dropping from shoulder height.
[5]As measured by riding wheel on skateboard as shown in FIG.1.

TABLE 5

| MATERIAL | TEMPERATURE (nozzle/middle/rear, °F.) | INJECTION TIME/COOL (seconds) | MOLD, °F. | COMMENTS |
|---|---|---|---|---|
| 1. Hytrel G3548 75 wt %: 25 wt % Hytrel 5556/Dupont | 390/390/380 | 30/60 | 100 | Non-melt at this temperature. Long cycle at higher temperature. |
| 2. Hytrel G4774 90 wt %: Dynaflex G6713-0001 10 wt %/Dupont, GLS Corporation | 425/425/400 | 30/50 | 100 | Excellent processing. Good Blending. |
| 3. Affinity SM 1300† | 370/370/270 | 5/100 | 90 | Excellent processing. |
| 4. Arnitel EL560/DSM† | 430/425/400 | 6/85 | 90 | Excellent processing. |
| 5. Arnitel PL380/DSM | 420/415/390 | 6/85 | 90 | Excellent processing. |
| 6. ELY 60/EMS American Grilon† | 400/410/390 | 7/110 | 90 | Excellent Processing. |
| 7. Engage SM 8400/† | 360/370/360 | 4/115 | 80 | Excellent processing. |
| 8. Hytrel 5556/Dupont† | 450/450/440 | 7/110 | 115 | Ecellent processing. |
| 9. Hytrel G3538W/Dupont | 320/320/320 | 30/60 | 100 | Excellent processing, fast cycle. |
| 10. Hytrel G4078W/Dupont | 390/390/360 | 6/84 | 90 | Excellent processing. |
| 11. Hytrel G4774/Dupont | 425/425/400 | 30/50 | 100 | Excellent processing, fast cycle. |
| 12. Hytrel G4774 with 5 wt % MB50-010 Silicone Additive in 63D Hytrel/Dupont, Dow-Corning | 425/425/400 | 30/50 | 100 | Excellent processing. |
| 13. Kraton D-1102/Shell Chemical† | 380/380/350 | 8/130 | 90 | Excellent processing. |
| 14. MXL80A01NAT/Montell† | 390/390/380 | 8/110 | 90 | Excellent processing. |
| 15. Pebax 3533/Elf Atochem† | 450/450/440 | 10/>4 minutes | 90 | Very slow cycle. Much sink. |
| 16. Pebax 4033/Elf Atochem† | 450/450/440 | 7/110 | 90 | Excellent processing. |
| 17. Pellethane 2102-85 A/Dow† | 420/425/430 | 8/110 | 90 | Some sink. |
| 18. Pellethane 2103-90 A/Dow† | 390/390/380 | 8/110 | 90 | Good processing. |
| 19. Pellethane 2103-95 AE/Dow† | 390/390/380 | 8/110 | 90 | Good processing. |
| 20. Pellethane 2355-95 AE/Dow† | 410/410/420 | 6/112 | 90 | Much sink. |
| 21. Santoprene 70A/Advanced Elastomer Systems† | 390/390/380 | 8/110 | 90 | Excellent processing. |
| 22. Suryln 8920/Dupont† | 460/480/340 | 7/150 | 90 | Long cycle. Much sink. |
| 23. XLX XE3106/EMS American Grilon† | 450/450/440 | 7/110 | 125 | Need nylon nozzle, otherwise many cold slugs. |
| 24. Arnitel PL380 with 1 wt % BIH 25 Foaming Agent/DSM, BI | 420/415/390 | 6/85 | 90 | Excellent processing. Splay and delamination on parts |
| 25. Arnitel PL380 with 1 wt % EX-127 Foaming Agent/DSM, BI | 420/415/390 | 6/85 | 90 | Excellent processing. Splay and delamination on parts. |
| 26. Arnitel PL380 with 1 wt % ACT-235 Foaming Agent/DSM, BI | 420/415/390 | 6/85 | 90 | Excellent processing. No splay or delamination. |

Data for 52 mm solid, single component wheel like shown in FIG.3 and sprue-gated as shown in FIG.4.
†Comparative examples only-not claimed in patent.

We claim:

1. A slow speed wheel composition comprising at least 20 wt % of a segmented thermoplastic copolyester or a blend of copolyesters consisting essentially of a multiplicity of recurring long chain ester units and short chain ester units joined head-to-tail through ester linkages, said long chain ester units being represented by the formula (A):

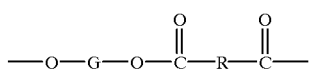

and said short chain units being represented by the formula (B):

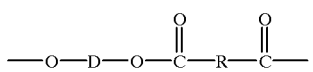

wherein
said short chain ester units make up between about 10 to about 95 wt % of said copolyester or blend of copolyesters; and G is a divalent radical remaining after the removal of terminal hydroxyl groups from a polyether glycol copolymer based on poly(propylene oxide) and poly(ethylene oxide); said polyether having a number average molecular weight of about 600–5000;

R is a divalent radical remaining after removal of carboxyl groups from a aromatic dicarboxylic acid; said aromatic dicarboxylic acid is selected from a group consisting of terphthalic acid, isophthalic acid and phthalic acid or mixtures thereof;

D is a divalent radical remaining after removal of hydroxyl groups from a diol having a molecular weight of less than about 250 or mixtures thereof.

2. The composition of claim 1 wherein said copolyester or a blend of copolyesters is further characterized by:
a flexural modulus of from about 1000 to about 150,000 psi, a hardness from about 15 to about 70 Shore D, elongation at break from about 75 to about 1000%, a melting point from about 250 to about 440° F., a brittle point of less than about 32° F., a 24 hr water absorption of less than 15 wt % and a melt flow rate of between about 0.1 to about 250.

3. The composition of claim 1 wherein said polyether glycol copolymer is an ethylene oxide-capped polypropylene oxide glycol.

4. The composition of claim 1 wherein said aromatic dicarboxylic acid is terphthalic acid or isophthalic acid or mixtures thereof.

5. The composition of claim 1 wherein said diol is 1,4-butanediol.

6. The composition of claim 1 wherein from about 75 to about 100 wt % of said composition is said copolyetherester or blend of copolyetheresters.

7. The composition of claim 1 wherein a blend of copolyetheresters is utilized.

8. The composition of claim 1 wherein an effective amount of of branching agent is employed in the manufacture of said copolyetherester.

9. The composition of claim 1 wherein a post curing operation is applied to the said copolyetherester or blend of copolyetheresters.

10. The composition of claim 1 wherein said short chains make up from about 25 to about 70 wt % of copolyetherester or blend of copolyetheresters.

11. The composition of claim 1 wherein an effective amount of anti-oxidant is utilized.

12. The composition of claim 1 wherein an effective amount of photo-stabilizer is utilized.

13. The composition of claim 1 wherein up to about 60 wt % filler is utilized.

14. The composition of claim 13 wherein a effective amount of coupling agent is utilized.

15. The composition of claim 13 wherein a effective amount of dispersing agent is utilized.

16. The composition of claim 1 wherein an effective amount of tackifying agent is utilized.

17. The composition of claim 1 wherein up to 60 wt % plastic modifier is utilized.

18. The composition of claim 1 wherein an effective amount of foaming agent is utilized.

19. The composition of claim 18 wherein said foaming agent is an endothermic foaming agent.

20. The composition of claim 18 wherein said foaming agent is an exothermic foaming agent.

21. The composition of claim 18 wherein said foaming agent contains an effective amount of dispersing agent.

22. The composition of claim 1 wherein a sprue gate, hot runner mold or a three plate mold are utilized.

23. The composition of claim 1 wherein said composition is overmolded onto a hub made of a different material.

24. A slow speed wheel composition comprising at least 40 wt % of a segmented thermoplastic copolyester or a blend of copolyesters consisting essentially of a multiplicity of recurring long chain ester units and short chain ester units joined head-to-tail through ester linkages, said long chain ester units being represented by the formula (A):

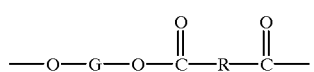

and said short chain units being represented by the formula (B):

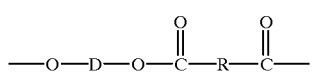

wherein
said short chain ester units make up between about 20 to about 75 wt % of said copolyester or blend of copolyesters; and G is a divalent radical remaining after the removal of terminal hydroxyl groups from a polyether glycol copolymer based on poly(propylene oxide) and poly(ethylene oxide); said polyether having a number average molecular weight of about 600–3500;

R is a divalent radical remaining after removal of carboxyl groups from a aromatic dicarboxylic acid having a molecular weight of less than about 300 or blends thereof;

D is a divalent radical remaining after removal of hydroxyl groups from a diol having a molecular weight of less than about 250 or blends thereof; and wherein said copolyester or a blend of copolyesters is characterized by a melt flow rate from about 0.1 to about 250, a 24 hr water absorption of less than 15 wt %, a flexural modulus of from about 1000 to about 150,000 psi, a hardness from about 15 to about 70 Shore D, elongation at break from about 75 to about 1000%, a melting point from about 250 to about 440° F. and a brittle point of less than about 32° F.

25. The composition of claim 24 wherein said polyether glycol copolymer is an ethylene oxide-capped polypropylene oxide glycol.

26. The composition of claim 24 wherein said aromatic dicarboxylic acid is terphthalic acid or isophthalic acid or mixtures thereof.

27. The composition of claim 24 wherein said diol is 1,4-butanediol.

28. The composition of claim 24 wherein a blend of copolyetheresters is utilized.

29. The composition of claim 24 wherein an effective amount of branching agent is employed in the manufacture of said copolyetherester.

30. The composition of claim 24 wherein a post curing operation is applied to the said copolyetherester or blend of copolyetheresters.

31. The composition of claim 24 wherein an effective amount of anti-oxidant is utilized.

32. The composition of claim 24 wherein an effective amount of photo-stabilizer is utilized.

33. The composition of claim 24 wherein up to about 60 wt % filler is utilized.

34. The composition of claim 33 wherein a effective amount of coupling agent is utilized.

35. The composition of claim 33 wherein a effective amount of dispersing agent is utilized.

36. The composition of claim 24 wherein an effective amount of tackifying agent is utilized.

37. The composition of claim 24 wherein up to 60 wt % plastic modifier is utilized.

38. The composition of claim 24 wherein an effective amount of foaming agent is utilized.

39. The composition of claim 38 wherein said foaming agent contains an effective amount of dispersing agent.

40. The composition of claim 24 wherein a sprue gate, hot runner mold or a three plate mold are utilized.

41. The composition of claim 24 wherein said composition is overmolded onto a hub made of a different material.

* * * * *